United States Patent [19]
Levine et al.

[11] Patent Number: 5,802,273
[45] Date of Patent: Sep. 1, 1998

[54] TRAILING EDGE ANALYSIS

[75] Inventors: Frank Eliot Levine; Roy Stuart Moore; Charles Philip Roth; Edward Hugh Welbon, all of Austin, Tex.

[73] Assignee: International Business Machines Corporation, Armonk, N.Y.

[21] Appl. No.: 767,662

[22] Filed: Dec. 17, 1996

[51] Int. Cl.⁶ .................................................. G06F 11/34
[52] U.S. Cl. ............................ 395/184.01; 395/183.06
[58] Field of Search .......................... 395/183.06, 184.01

[56] References Cited

U.S. PATENT DOCUMENTS

| | | | |
|---|---|---|---|
| 5,564,015 | 10/1996 | Bunnell | 395/184.01 |
| 5,594,864 | 1/1997 | Trauben | 395/183.15 |
| 5,691,920 | 11/1997 | Levine et al. | 395/184.01 |

OTHER PUBLICATIONS

Welbon, E.H., et al., "Load Miss Performance Analysis Methodology Using the Power PC 604 Performance Monitor for OLTP Workloads, Digest of Papers. COMPCON'96. Technologies for the Information Superhighway. Forty-First IEEE Computer Society International Conference (Cat. No. 96CB35911), Feb. 25–28, 1996, pp. 111–116.

*Performance Monitor, PowerPC 604 RISC Microprocessor User's Manual*, Chapter 9, pp. 9-1 through 9-11, IBM 1994.

*Primary Examiner*—William M. Treat
*Attorney, Agent, or Firm*—Kelly K. Kordzik; Winstead Sechrest & Minick P.C.; Mark E. McBurney

[57] ABSTRACT

A performance monitor implementing a plurality of counters counts several events to provide an instruction fetch bandwidth analysis, a cycles per instruction (CPI) infinite and finite analysis, an operand fetch bandwidth analysis, an instruction parallelism analysis, and a trailing edge analysis. Such analyses are performed on the performance of a data processing system in order that the designer may develop an improved processor architecture.

19 Claims, 13 Drawing Sheets

FIG. 3

| BUFFER NUMBER | INSTRUCTION TYPE / EXECUTION UNIT | #GPR DEST. | #FPR DEST. | FINISHED | EXCEPTION |
|---|---|---|---|---|---|
| 0 | 22 | 1 | 0 | 0 | 0 |
| 1 | 22 | 1 | 0 | 0 | 0 |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |

COMPLETION ↑ 75
ALLOCATION ↑ 73

| BITS 0-4 COUNTING ENABLES | BIT 5 INTERRUPT ENABLES | BITS 6-15 | BIT 16 PMC1 INTERRUPT CONTROL | BIT 17 PMCn, n>1 COUNT CONTROL | BIT 18 PMCn, n>1 COUNT CONTROL | BITS 19-25 PMC1 EVENT SELECTION | BITS 26-31 PMC2 EVENT SELECTION |

MMCR0

FIG. 6B

| BITS 0-4 PMC3 EVENT SELECTION | BITS 5-9 PMC4 EVENT SELECTION | BITS 10-14 PMC5 EVENT SELECTION | BITS 15-19 PMC6 EVENT SELECTION | BITS 20-24 PMC7 EVENT SELECTION | BITS 25-28 PMC8 EVENT SELECTION | BIT 29 FCUIABR | BIT 30 UPDATING MODE PMC1 | BIT 31 UPDATING MODE PMCn, n>1 |

MMCR1

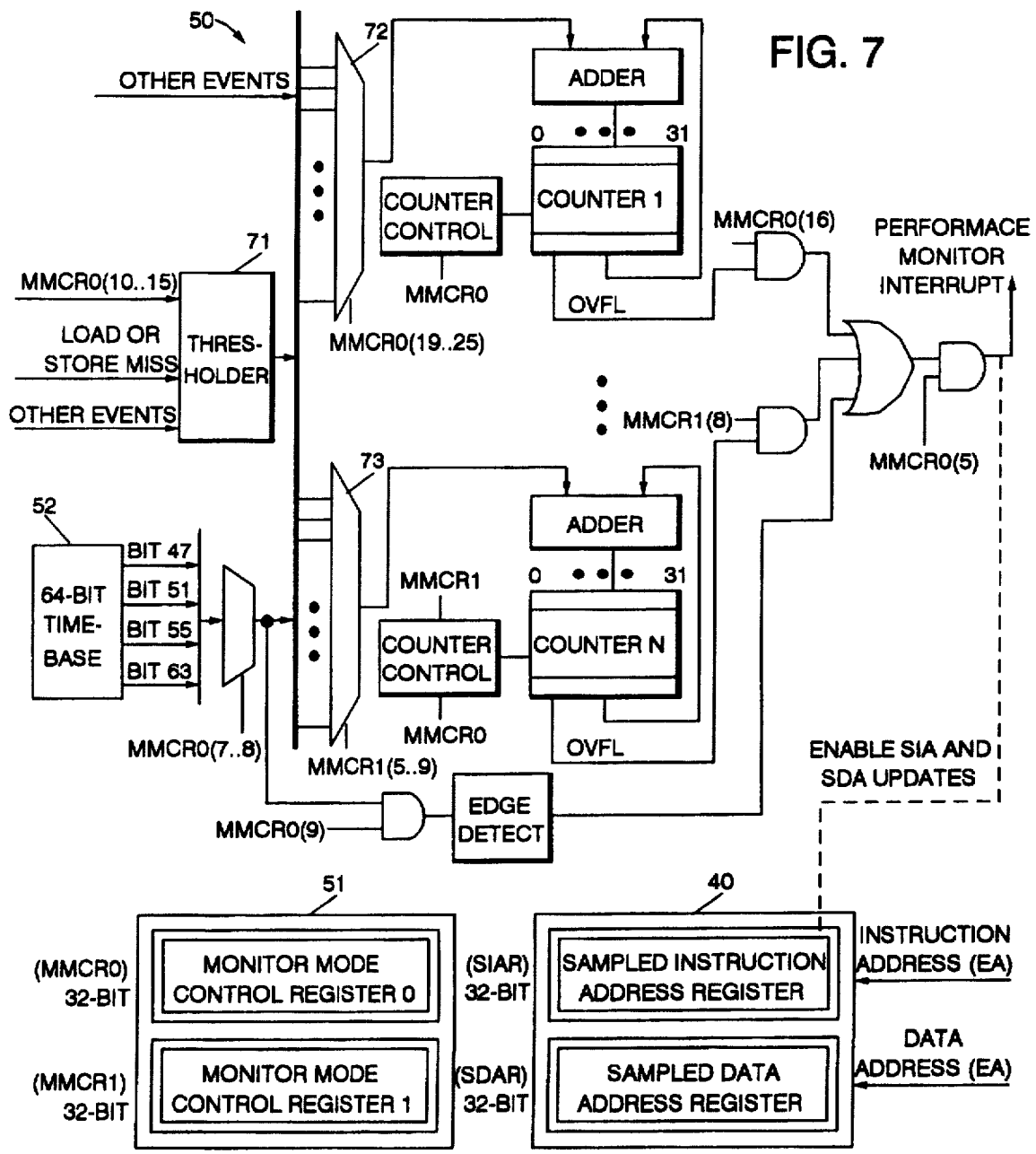

TRAILING EDGE ANALYSIS

CROSS-REFERENCE TO RELATED APPLICATIONS

The present application is related to applications Ser. No. 08/497,242, entitled "Method and System for Halting Processor Execution in Response to an Enumerated Occurrence of a Selected Combination of Internal States," filed on Jun. 30,1995, Ser. No. 08/485,953, entitled, "On-Chip Performance Monitoring with a Characterization of Locks/ Semaphore Utilization," filed on Jun. 7, 1995, Ser. No. 08/537,586, entitled "A Method and System for Performance Monitoring Through Identification of Frequency and Length of Time of Execution of Serialization Instructions in a Processing System," Ser. No. 08/537,645, entitled "A Method and System for Performance Monitoring Through Monitoring an Order of Processor Events During Execution in a Processing System," Ser. No. 08/538,071, entitled "A Method and System for Selecting and Distinguishing an Event Sequence Using an Effective Address in a Processing System," Ser. No. 08/539,023, entitled "A Method and System for Performance Monitoring Time Lengths of Disabled Interrupts in a Processing System," Ser. No. 08/538,102, entitled "A Method and System for Performance Monitoring Stalls to Identify Pipeline Bottlenecks and Stalls in a Processing System," Ser. No. 08/538,509, entitled "A Method and System for Performance Monitoring Efficiency of Branch Unit Operation in a Processing System," Ser. No. 08/536,492, entitled "A Method and System for Performance Monitoring of Misaligned Memory Accesses in a Processing System," Ser. No. 08/538,774, entitled "A Method and System for Performance Monitoring of Dispatch Stalls in a Processing System", Pat. No. 5,691,920, entitled "A Method and System for Performance Monitoring of Dispatch Unit Efficiency in a Processing System," and Ser. No. 08/734,335, entitled "Performance Monitor," which are assigned to the assignee of the present application, and Ser. No. 08/766,143, entitled "CPI Infinite and Finite Analysis," Ser. No. 08/767,706, entitled "Operand Fetch Bandwidth Analysis," Ser. No. 08/767,656, entitled "Instruction Parallelism Analysis," Ser. No. 08/767,655, entitled "Load Stall Analysis," and Ser. No. 08/767,705, entitled "Instruction Fetch Bandwidth Analysis", which are assigned to the assignee of the present application, and which are all filed concurrently herewith, and which are all hereby incorporated by reference herein.

TECHNICAL FIELD

The present invention relates in general to data processing systems, and in particular, to performance monitoring in data processing systems.

BACKGROUND INFORMATION

In typical computer systems utilizing processors, systems developers desire optimization of execution software for more effective system design. Usually, studies of a program's access patterns to memory and interaction with a system's memory hierarchy are performed to determine system efficiency. Understanding the memory hierarchy behavior aids in developing algorithms that schedule and/or partition tasks, as well as distribute and structure data for optimizing the system.

Performance monitoring is often used in optimizing the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. The information produced usually guides system architects toward ways of enhancing performance of a given system or of developing improvements in the design of a new system.

Prior art approaches to performance monitoring include the use of test instruments. Unfortunately, this approach is not completely satisfactory. Test instruments can be attached to the external processor interface, but these cannot determine the nature of internal operations of a processor. Test instruments attached to the external processor interface cannot distinguish between instructions executing in the processor. Test instruments designed to probe the internal components of a processor are typically considered prohibitively expensive because of the difficulty associated with monitoring the many busses and probe points of complex processor systems that employ pipelines, instruction prefetching, data buffering, and more than one level of memory hierarchy within the processors. A common approach for providing performance data is to change or instruments the software. This approach however, significantly affects the path of execution and may invalidate any results collected. Consequently, software-accessible counters are incorporated into processors. Most software-accessible counters, however, are limited in the amount of granularity of information they provide.

Further, a conventional performance monitor is usually unable to capture machine state data until an interrupt is signaled, so that results may be biased toward certain machine conditions that are present when the processor allows interrupts to be serviced. Also, interrupt handlers may cancel some instruction execution in a processing system where, typically, several instructions are in progress at one time. Further, many interdependencies exist in a processing system, so that in order to obtain any meaningful data and profile, the state of the processing system must be obtained at the same time across all system elements. Accordingly, control of the sample rate is important because this control allows the processing system to capture the appropriate state. It is also important that the previous sample has on the sample being monitored is negligible to ensure the performance monitor does not affect the performance of the processor. Accordingly, there exists a need for a system and method for effectively monitoring processing system performance that will efficiently and noninvasively identify potential areas for improvement. A more effective performance monitoring system has been disclosed in the cross-referenced applications noted above.

However, these systems are not wholly sufficient for all purposes and hence may be expanded upon in a way that assists architects and implementers in improving computer system performance through better understanding of the effect of the memory hierarchy on the performance of the processor in question.

Consider the linear performance model (or just linear model) that is standardly used to evaluate and compare performance of central processing units (CPUs). The equation is usually stated as follows:

$$CPI\_finite = CPI\_infinite + DC\_miss\_ratio * DC\_miss\_penalty + IC\_miss\_ratio * IC\_miss\_penalty$$

The following serves to define the six factors in the above equation:

CPI_finite=cycles per instruction of a given implementation when executing a particular workload CPI_infinite=the minimum cycles per instruction required on average to execute a given workload when the closest level of the memory hierarchy (typically the primary (L1) caches) always has the needed information DC_miss_ratio=number of L1 data cache misses per instruction on average IC_miss_ratio=number of L1 instruction cache misses per instruction on average DC_miss_penalty=Average number of cycles per L1 data cache miss per instruction IC_miss_penalty=Average number of cycles per L1 instruction cache miss per instruction These six factors, specifically CPI_finite, CPI_infinite, DC_miss_ratio, IC_miss_ratio, DC_miss_penalty, and IC_miss penalty, shall be referred to as the CPU performance signature parameters, or for brevity, simply as the parameters or factors.

Clearly, any five of these factors will serve to define all six (i.e., if only one factor is not known, the known five will allow for the determination of the unknown sixth factor). In standard practice one desires to determine via measurement all of these factors except for CPI_infinite which is calculated. It is also possible to describe subsequent levels of cache or memory hierarchy (L2 (secondary), L3, or memory, disk, etc.). To simplify the discussion, these will not be considered, but a straightforward modification of the equation provides for these. For example:

CPI_finite = CPI_infinite +

(L1_DC_miss_ratio-L2_DC_hit_ratio))*L1_DC_miss_penalty +
(L1_IC_miss_ratio-L2_IC_hit_ratio))*L1_IC_miss_penalty +
L2_DC_miss_ratio*L2_DC_miss_penalty +

L2_IC_miss_ratio*L2_IC_miss_penalty

In this case, there is the additional detail of the activity of the external cache (sometimes referred to as the L2 cache). For the purposes of this discussion, this detail will not consider this additional detail, though it is valid and meaningful to do so. In the remainder at this disclosure, the discussion will be restricted to the examination of the influence of L1 caches only, but it is understood that this discussion applies to any level of memory hierarchy using suitable extensions.

The usual approach in using the linear model is that one determines the factors for a given workload and then considers hardware/software modifications to these factors to understand the effect on the CPI. In particular, CPI_infinite is an estimate of the best case performance of the CPU with an ideal (though possibly very expensive) storage hierarchy and is an important characteristic of the CPU and workload of interest (measurement shows that the behavior of the workload and the CPU can not be separated in any meaningful manner). In particular, one supposes that a different memory subsystem design can reduce the storage access times by some amount. This change in the memory subsystem design will be reflected in the net delays for the various cache miss penalties. Thus, one can recompute the CPI_finite based on the different memory system design.

The rate of progress of the workload on a system depends on the number of instructions that can be executed per second. Since the number of instructions that must be executed is essentially invariant and known, the rate at which instructions execute determines the performance of a given workload on the system of interest.

Assuming that cost of a hypothesized memory system is known, the resultant system cost can be compared to the projected performance. Thus, product planners can have a better understanding of the price/performance trade-offs involved with various subsystem designs. In this manner, a system configuration can be more accurately determined with the result of best price/performance. The value of such knowledge is clear.

There are many cases in which a PowerPC 604 performance monitor (one example of a performance monitor) can provide most of the required parameters (excepting for CPI_infinite, which in the past has always been derived from the 5 remaining factors). However, there are cases where the CPI_infinite cannot be so determined, namely those cases where there is significant parallelism due to out of order execution. Advances in compiler and CPU technology is forcing this case to occur more and more frequently.

Hence, under the case of high instruction execution parallelism, knowing the time that a data cache miss is in progress is not sufficient to characterize the effect that a data cache miss has on average to CPI_finite. Likewise, a similar situation exists with instruction cache misses; parallelism confounds the ability to determine the true cost to the performance due to such cache misses. Therefore, there is a lack of an ability to understand the most crucial factors limiting CPU performance in current performance monitoring implementations. This limitation is a serious one because it prohibits one from quickly and accurately evaluating system performance and thereby confounds attempts to design systems exhibiting superior cost/performance trade-offs. Thus, there is a need to correct these shortcomings encountered when measuring processors capable of out of order execution.

SUMMARY OF THE INVENTION

The present invention addresses the foregoing need by providing a performance monitor comprising a plurality of counters for counting various events occurring within the processing system. In one form, the present invention is a performance monitor in a data processing system in a method thereof comprising the steps of receiving signals associated with a load/store cache miss blocking an instruction cache miss, and counting signals associated with the load/store cache miss blocking the instruction cache miss. In a second form, the present invention is a method in a data processing system comprising the steps of (1) counting a number of cycles when the load/store cache miss is blocking the instruction cache miss, (2) counting a number of times that the load/store cache miss is blocking the instruction cache miss, (3) counting a number of cycles when the instruction cache miss is blocking the load/store cache miss, and (4) counting a number of times when the instruction cache miss is blocking the load/store cache miss.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 3 is a conceptual illustration of a reorder buffer of the sequencer unit of FIG. 2;

FIGS. 6A and 6B illustrate monitor control registers (MMCRn) utilized to manage a plurality of counters;

FIG. 7 illustrates a block diagram of a performance monitor configured in accordance with the present invention;

DETAILED DESCRIPTION

Figure 1:
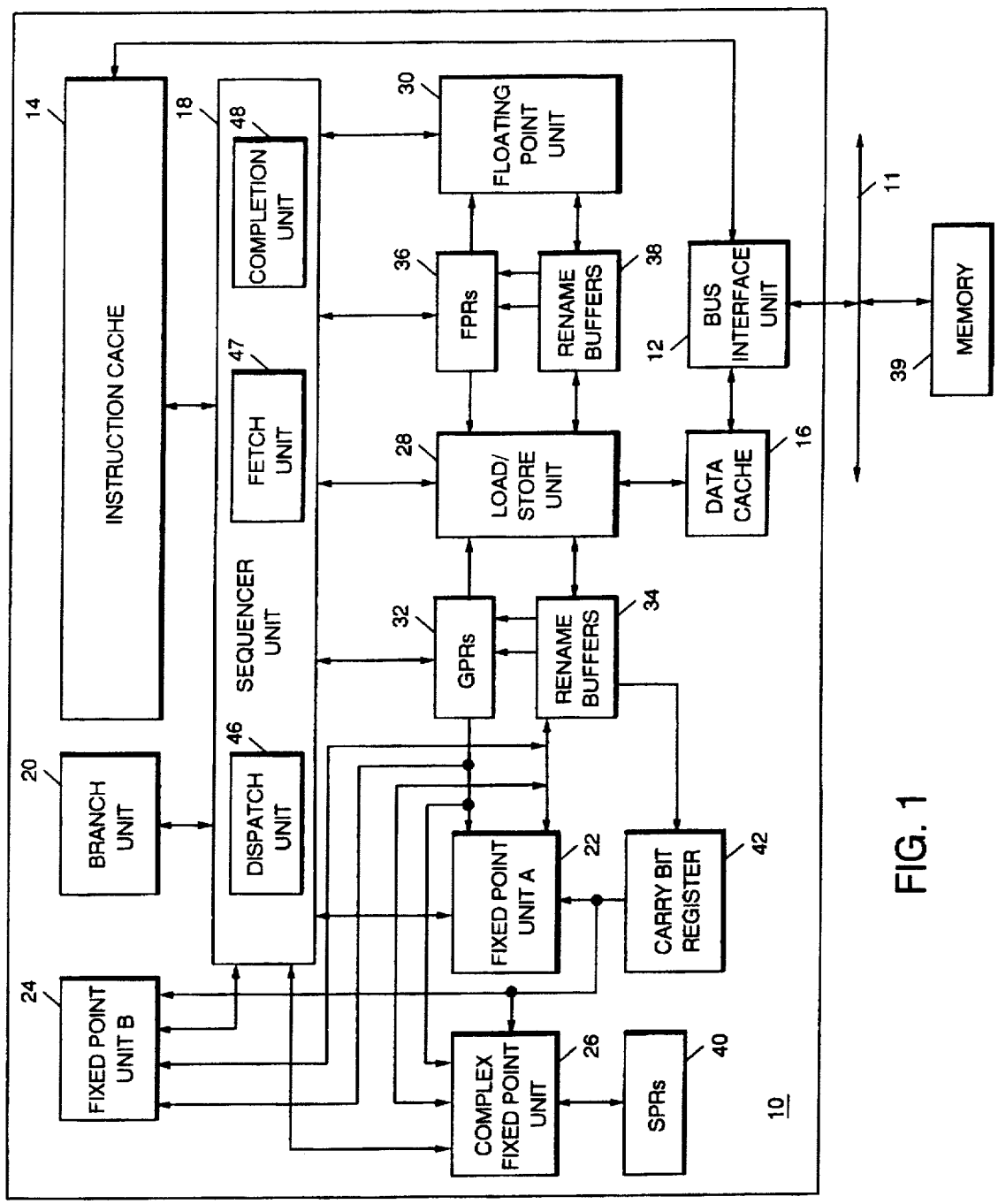
FIG. 1 is a block diagram of a processor for processing information in accordance with the present invention.

In the following description, numerous specific details are set forth such as specific word or byte lengths, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a block diagram of a processor 10 system for processing information according to one embodiment. Processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46, a fetch unit 47, and a completion unit 48, the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42.

FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information 1from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g., one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18.

Sequencer unit 18 directs such copying of information stored at a selected one of rename buffers 34 in response to "completing" the instruction that generated the information through a completion unit 48. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "superscalar pipelining". An instruction is normally processed as six stages, namely fetch, decode, dispatch, execute, completion, and writeback.

In the fetch stage, sequencer unit 18 (fetch unit 47) selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28 and 30 after reserving a rename buffer entry for each dispatched instruction's result (destination operand information) through a dispatch unit 46. In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out of order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

Although it would be desirable for each instruction to take one machine cycle to complete each of the stages of instruction processing, in most implementations, there are some instructions (e.g., complex fixed point instructions executed by CFXU 26) that require more than one cycle. Accordingly, a variable delay may occur between a particular instruction's execution and completion stages in response to the variation in time required for completion of preceding instructions.

Figure 2:
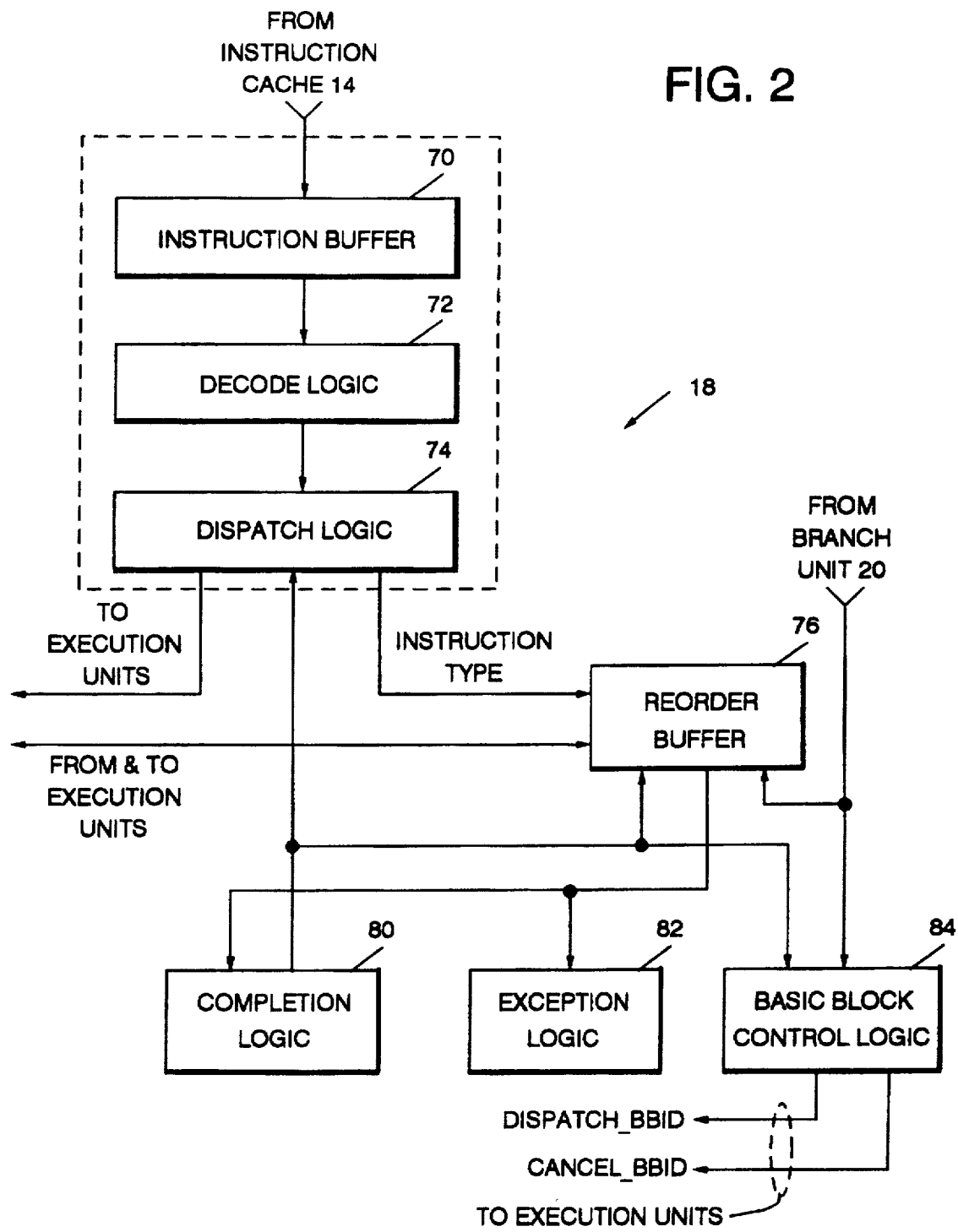
FIG. 2 is a block diagram of a sequencer unit of the processor of FIG. 1.

FIG. 2 is a block diagram of sequencer unit 18. As discussed further hereinabove, in the fetch stage, sequencer unit 18 selectively inputs up to four instructions from instructions cache 14 and stores such instructions in an instruction buffer 70. In the decode stage, decode logic 72 inputs and decodes up to four fetched instructions from instruction buffer 70. In the dispatch stage, dispatch logic 74 selectively dispatches up to four decoded instructions to selected (in response to the decoding in the decode stage) ones of execution units 20, 22, 24, 26, 28 and 30.

FIG. 3 is a conceptual illustration of a reorder buffer 76 of sequencer unit 18. As shown in FIG. 3, reorder buffer 76 has sixteen entries respectively labelled as buffer numbers 0-15. Each entry has five primary fields, namely an "instruction type" field, a "number-of-GPR destinations" field, a "number-of-FPR destinations" field, a "finished" field, and an "exception" field.

Referring also to FIG. 2, as dispatch logic 74 dispatches an instruction to an execution unit, sequencer unit 18 assigns the dispatched instruction to an associated entry in reorder buffer 76. Sequencer unit 18 assigns (or "associates") entries in reorder buffer 76 to dispatched instructions on a first-in first-out basis and in a rotating manner, such that sequencer unit 18 assigns entry 0, followed sequentially by entries 1-15, and then entry 0 again. As the dispatched instruction is assigned an associated entry in reorder buffer 76, dispatch logic 74 outputs information concerning the dispatched instruction for storage in the various fields and subfields of the associated entry in reorder buffer 76.

For example, in entry 1 of FIG. 3, reorder buffer 76 indicates the instruction is dispatched to FXUA 22. Entry 1 further indicates the dispatched instruction has one GPR destination register (such that "number-of-GPR destinations"=1), has zero FPR destination registers (such that "number-of-FPR destinations"=0), is not yet finished (such that "finished"=0), and has not yet caused an exception (such that "exception"=0).

As an execution unit executes a dispatched instruction, the execution unit modifies the instruction's associated entry in reorder buffer 76. More particularly, in response to finishing execution of the dispatched instruction, the execution unit modifies the entry's "finished" field (such that "finished"=1). If the execution unit encounters an exception during execution of the dispatched instruction, the execution unit modifies the entry's "exception" field (such that "exception"=1).

FIG. 3 shows an allocation pointer 73 and a completion pointer 75. Processor 10 maintains such pointers for controlling reading from and writing to reorder buffer 76.

Processor 10 maintains allocation pointer 73 to indicate whether a reorder buffer entry is allocated to (or "associated with") a particular instruction. As shown in FIG. 3, allocation pointer 73 points to reorder buffer entry 3, thereby indicating that reorder buffer entry 3 is the next reorder buffer entry available for allocation to an instruction.

Also, processor 10 maintains completion pointer 75 to indicate (for a reorder buffer entry previously allocated to a particular instruction) whether the particular instruction satisfies the following conditions:

Condition 1—The execution unit (to which the instruction is dispatched) finishes execution of the instruction;

Condition 2—No exceptions were encountered in connection with any stage of processing the instruction; and Condition 3—Any previously dispatched instruction satisfies Condition 1 and Condition 2.

As shown in FIG. 3, completion pointer 75 points to reorder buffer entry 1, thereby indicating that reorder buffer entry 1 is the next reorder buffer entry capable of satisfying Conditions 1, 2 and 3. Accordingly, "valid" reorder buffer entries can be defined as the reorder buffer entry pointed to by completion buffer 75 and its subsequent reorder buffer entries that precede the reorder buffer entry pointed to by allocation pointer 73.

Referring again to FIG. 2, the entries of reorder buffer 76 are read by completion logic 80 and exception logic 80 of sequencer unit 18. In response to the "exception" fields of reorder buffer 76, exception logic 82 handles exceptions encountered during execution of dispatched instructions. In response to the "finished" fields and "exception" fields of reorder buffer 76, completion logic 80 indicates "completion" of instructions in order of their programmed sequence. Completion logic 80 indicates "completion" of an instruction if it satisfies the following conditions.

Condition 1—The execution unit (to which the instruction is dispatched) finishes execution of the instruction (such that "finished"=1 in the instruction's associated entry in reorder buffer 76);

Condition 2—No exceptions were encountered in connection with any stage of processing the instruction (such that "exception"=0 in the instruction's associated entry in reorder buffer 76); and Condition 3—Any previously dispatched instruction satisfies Condition 1 and Condition 2.

In response to information in reorder buffer 76, dispatch logic 74 determines a suitable number of additional instructions to be dispatched.

Figure 4:
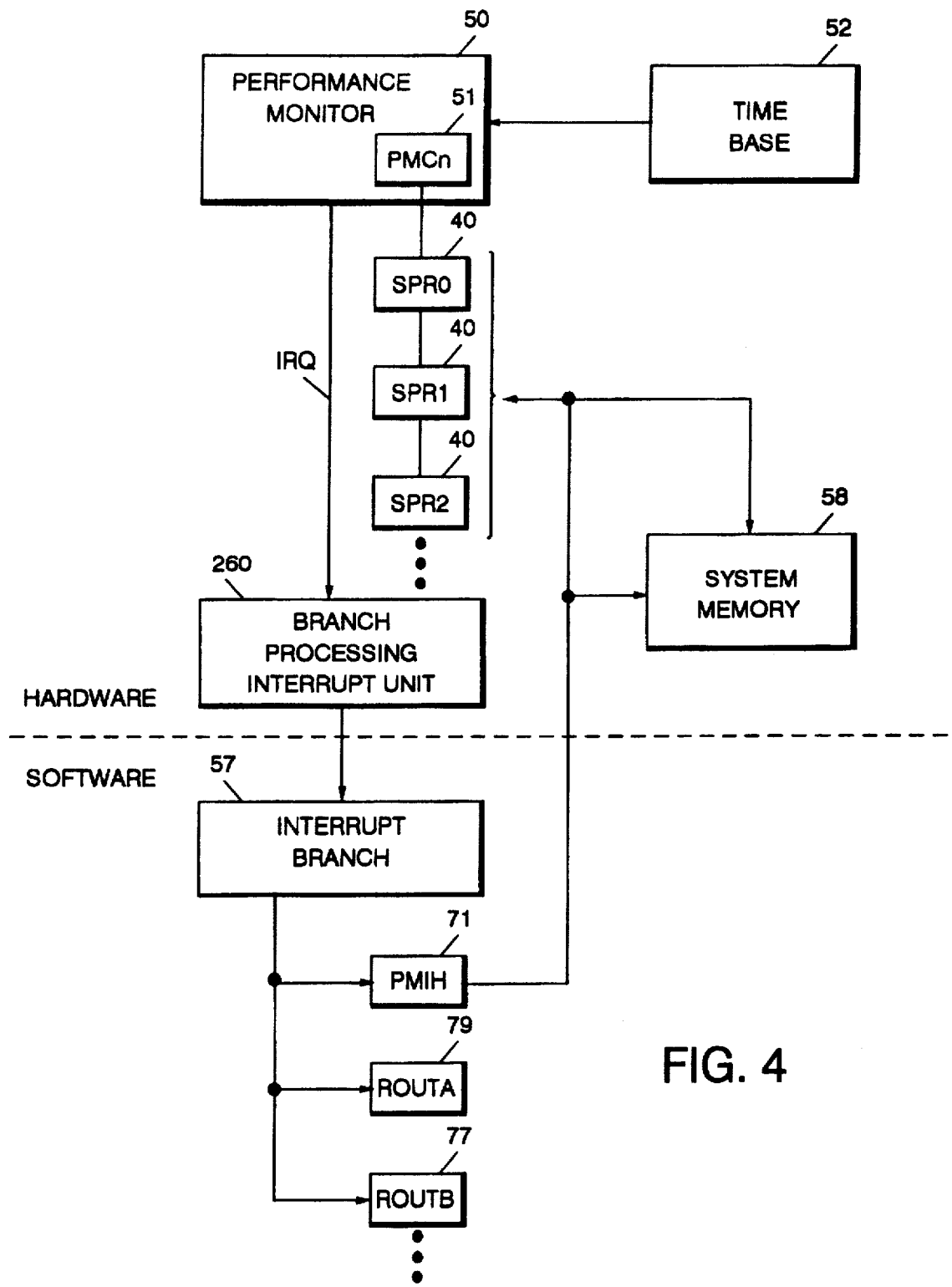
FIG. 4 is a block diagram of a performance monitoring aspect of the present invention.

Referring to FIGS. 4 and 7, a feature of processor 10 is performance monitor (PM) 50. Performance monitor 50 is a software-accessible mechanism intended to provide detailed information with significant granularity concerning the utilization of PowerPC instruction execution and storage control. Generally, the performance monitor 50 includes an implementation-dependent number (e.g., 2–8) of counters 51, e.g., PMC1–PMC8, used to count processor/storage related events. Further included in performance monitor 50 are monitor mode control registers (MMCRn) that establish the function of the counters PMCn, with each MMCR usually controlling some number of counters. Counters PMCn and registers MMCRn are typically special purpose registers physically residing on the processor 10, e.g., a PowerPC. These special purpose registers are accessible for read or write via mfspr (move from special purpose register) and mtspr (move to special purpose register) instructions, where the writing operation is allowed in a privileged or supervisor state, while reading is allowed in a problem state since reading the special purpose registers does not change the register's content. In a different embodiment, these registers may be accessible by other means such as addresses in I/O space.

The MMCRn registers are partitioned into bit fields that allow for event/signal selection to be recorded/counted. Selection of an allowable combination of events causes the counters to operate concurrently.

The MMCRn registers include controls, such as counter enable control, counter negative interrupt controls, counter event selection, and counter freeze controls, with an implementation-dependent number of events that are selectable for counting. Smaller or larger counters and registers may be utilized to correspond to a particular processor and bus architecture or an intended application, so that a different number of special purpose registers for MMCRn and PMCn may be utilized without departing from the spirit and scope of the present invention.

The performance monitor 50 is provided in conjunction with a time base facility 52 which includes a counter that designates a precise point in time for saving the machine state. The time base facility 52 includes a clock with a frequency that is typically based upon the system bus clock and is a required feature of a superscalar processor system including multiple processors 10 to provide a synchronized time base. The time base clock frequency is provided at the frequency of the system bus clock or some fraction, e.g., ¼, of the system bus clock.

Predetermined bits within a 64-bit counter included in the time base facility 52 are selected for monitoring such that the increment of time between monitored bit flips can be controlled. Synchronization of the time base facility 52 allows all processors in a multiprocessor system to initiate operation in synchronization. Examples of methods for performing such synchronization are provided in co-pending U.S. patent application Ser. No. 08/675,427, entitled "Performance Monitoring in a Multiprocessor System With Interrupt Masking", assigned to an assignee of the present invention and incorporated herein by reference in its entirety.

Time base facility 52 further provides a method of tracking events occurring simultaneously on each processor of a multiprocessor system. Since the time base facility 52 provides a simple method for synchronizing the processors, all of the processors of a multiprocessor system detect and react to a selected single system-wide event in a synchronous manner. The transition of any bit or a selected one of a group of bits may be used for counting a condition among multiple processors simultaneously such that an interrupt is signalled when a bit flips or when a counted number of events has occurred.

In operation, a notification signal is sent to PM 50 from time base facility 52 when a predetermined bit is flipped. The PM 50 then saves the machine state values in special purpose registers. In a different scenario, the PM 50 uses a "performance monitor" interrupt signalled by a negative counter (bit zero on) condition. The act of presenting the state information including operand and address data may be delayed if one of the processors has disabled interrupt handling.

In order to ensure that there is no loss of data due to interrupt masking, when the interrupt condition is signaled, the processors capture the effective instruction and operand (if any) addresses of "an" instruction in execution and present an interrupt to the interrupt resolution logic 57, which employs various interrupt handling routines 71, 77, 79. These addresses are saved in registers, Saved Data Address (SDAR) and Saved Instruction Address (SIAR), which are designated for these purposes at the time of the system-wide signaling. The state of various execution units are also saved. This state of various execution units at the time the interrupt is signalled is provided in a saved state register (SSR). This SSR could be an internal register or a software accessible SPR. Thus, when the interrupt is actually serviced, the content of these registers provide the information concerning current instructions that are currently executing in the processor at the time of the signaling.

When the PM 50 receives the notification from time base 52 to indicate that it should record "sample data", an interrupt signal is output to a branch processing unit 20. Concurrently, the sample data (machine state data) is placed in SPRs 40 including the SIAR, SDAR and SSR which are suitably provided as registers or addresses in I/O space. A flag may be used to indicate interrupt signalling according to a chosen bit transition as defined in the MMCRn. Of course, the actual implementation of the time base facility 52 and the selected bits is a function of the system and processor implementation.

Figure 5:
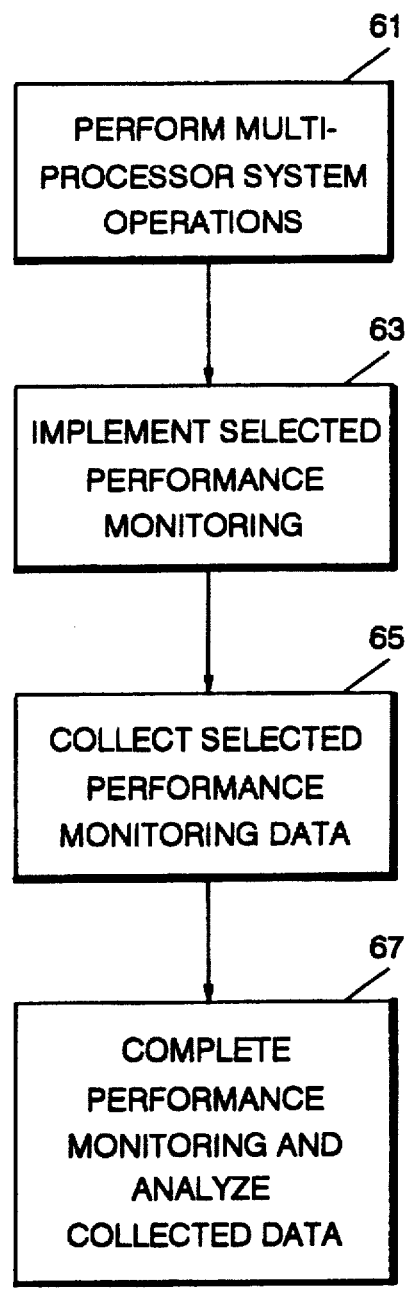
FIG. 5 is a block diagram of an overall process flow in accordance with the present invention of processing system operation including performance monitoring.

A block diagram, as shown in FIG. 5, illustrates an overall process flow in accordance with the present invention of superscalar processor system operation including performance monitoring. The process begins in block 61 with the processing of instructions within the superscalar processor system. During the superscalar processor system operation, performance monitoring is implemented in a selected manner via block 63 through configuration of the performance monitor counters by the monitor mode control registers and performance monitoring data is collected via block 65.

By adjusting the values of the performance monitor counts, that is by setting the values of the counters high enough so that an exception is signalled by some predetermined number of occurrences of an event, a profile of system performance can be obtained. Further, for purposes of this disclosure, a performance monitoring interrupt preferably occurs at a selectable point in the processing. As described in more detail below, a predetermined number of events is suitably used to select the stop point. For example, counting can be programmed to end after two instructions by causing the counter to go negative after the completion of two instructions. Further, for purposes of this disclosure, the time period during which monitoring occurs is known. Thus, the data collected has a context in terms of the number of minutes, hours, days, etc. over which the monitoring is performed.

As described herein below, selected performance monitoring includes reconstructing a relationship among events, identifying false triggering, identifying bottlenecks, monitoring stalls, monitoring idles, determining the efficiency of operation of a dispatch unit, determining the effectiveness of branch unit operations, determining a performance penalty of misaligned data accesses, identifying a frequency of execution of serialization instructions, identifying inhibited interrupts, and applying Little's Law to identify efficiency.

The selected performance monitoring routine is completed and the collected data is analyzed via block 67 to identify potential areas of system enhancements. A profiling mechanism, such as a histogram, may be constructed with the data gathered to identify particular areas in the software or hardware where performance may be improved. Further, for those events being monitored that are time sensitive, e.g., a number of stalls, idles, etc., the count number data is collected over a known number of elapsed cycles so that the data has a context in terms of a sampling period. It should be appreciated that analysis of collected data may be facilitated using such tools as "aixtrace" or a graphical performance visualization tool "pv", each of which is available from IBM Corporation.

In FIG. 6a, an example representation of one configuration of MMCR0 suitable for controlling the operation of two PMC counters, e.g., PMC1 and PMC2, is illustrated. As shown in the example, MMCR0 is partitioned into a number of bit fields whose settings select events to be counted, enable performance monitor interrupts, specify the conditions under which counting is enabled, and set a threshold value (X).

The threshold value (X) is both variable and software selectable and its purpose is to allow characterization of certain data, such that by accumulating counts of accesses that exceed decreasing threshold values, designers gain a clearer picture of conflicts. The threshold value (X) is considered exceeded when a decrementer reaches zero before the data instruction completes. Conversely, the threshold value is not considered exceeded if the data instruction completes before the decrementer reaches zero; of course, depending on the data instruction being executed, "completed" has different meanings. For example, for a load instruction, "completed" indicates that the data associated with the instruction was received, while for a "store" instruction, "completed" indicates that the data was successfully written. A user readable counter, e.g., PMC1, suitably increments every time the threshold value is exceeded.

A user may determine the number of times the threshold value is exceeded prior to the signalling of performance monitor interrupt. For example, the user may set initial values for the counters to cause an interrupt on the 100th data miss that exceeds the specified threshold. With the appropriate values, the PM facility is readily suitable for use in identifying system performance problems.

Referring to FIG. 6a, as illustrated by this example, bits 0–4 and 18 of the MMCR0 determine the scenarios under which counting is enabled. By way of example, bit 0 is a freeze counting bit (FC). When at a high logic level (FC=1), the values in PMCn counters are not changed by hardware events, i.e., counting is frozen. When bit 0 is at a low logic level (FC=0), the values of the PMCn can be changed by chosen hardware events. Bits 1–4 indicate other specific conditions under which counting is frozen.

For example, bit 1 is a freeze counting while in a supervisor state (FCS) bit, bit 2 is a freeze counting while in a problem state (FCP) bit, bit 3 is a freeze counting while PM=1 (FCPM1) bit, and bit 4 is a freeze counting while PM=0 (FCPM0) bit. PM represents the performance monitor marked bit, bit 29, of a machine state register (MSR) (SPR 40, FIG. 1). For bits 1 and 2, a supervisor or problem state is indicated by the logic level of the PR (privilege) bit of the MSR. The states for freezing counting with these bits are as follows: for bit 1, FCS=1 and PR=0; for bit 2, FCP=1 and PR=1; for bit 3, FCPM1=1 and PM=1; and for bit 4, FCPM0=1 and PM=0. The state for allowing counting with these bits are as for bit 1, FCS=1 and PR=1; for bit 2, FCP=1 and PR=0; for bit 3, FCPM1=1 and PM=0; and for bit 4, FCPM0=1 and PM=1.

Bits 5, 16, and 17 are utilized to control interrupt signals triggered by PMCn. Bits 6–9 are utilized to control the time or event-based transitions. The threshold value (X) is variably set by bits 10–15. Bit 18 control counting enablement for PMCn, n>1, such that when low, counting is enabled, but when high, counting is disabled until bit 0 of PMC1 is high or a performance monitoring exception is signaled. Bits 19–25 are used for event selection, i.e, selection of signals to be counted, for PMC1.

FIG. 6b illustrates a configuration of MMCR1 in accordance with an embodiment of the present invention. Bits 0–4 suitably control event selection for PMC3, while bits 5–9 control event selection for PMC4. Similarly, bits 10–14 control event selection for PMC5, bits 15–19 control event selection for PMC6, bits 20–24 control event selection for PMC7, and bits 25–28 control event selection for PMC8.

The counter selection fields, e.g., bits 19–25 and bits 26–31 of MMCR0 and bits 0–28 of MMCR1, preferably have as many bits necessary to specify the full domain of selectable events provided by a particular implementation.

At least one counter is required to capture data for performance analysis. More counters provide for faster and more accurate analysis. If the scenario is strictly repeatable, the same scenario may be executed with different items being selected. If the scenario is not strictly repeatable, then the same scenario may be run with the same item selected multiple times to collect statistical data. The time from the start of the scenario is assumed to be available via system time services so that intervals of time may be used to correlate the different samples and different events.

U.S. patent application Ser. No. 08/537,417, entitled "A Method and System for Performance Monitoring Time Lengths of Instruction Execution in a Processing System," which is hereby incorporated by reference herein, further discusses selecting and distinguishing an event sequence using an effective address, performance monitoring through monitoring an order of processor events during execution, performance monitoring to identify bottlenecks and stalls, performance monitoring of the effect of memory accesses on a processor system, performance monitoring of dispatch unit deficiency, performance monitoring of idles, performance monitoring of misaligned memory accesses, performance monitoring of serialization instructions, performance monitoring of efficiency of branch unit operation, performance monitoring of time lengths of disabled interrupts, and performance monitoring of the time lengths of instruction execution. For further discussion of performance monitoring, please refer to Chapter 9, *Performance Monitor, PowerPC 604 RISC Microprocessor User's Manual*, pp. 9–1 through 9–11, IBM 1994, which is hereby incorporated by reference herein. In this reference, there are a couple of tables indicating code points for storage within the MMCRn registers, such as the registers illustrated in FIGS. 6a and 6b, which notify the various counters PMCn what events to monitor and in what fashion.

Referring next to FIG. 7, there is illustrated an embodiment for implementing the present invention. FIG. 7 illustrates performance monitor 50 having a couple of MMCRn registers 51 shown, SIAR and SDAR registers 40, PMC 1... PMCn (noted as Counters 1... N) with their associated adders and counter control logic being fed by multiplexer 72...73 controlled by various bits of the MMCRn registers. Multiplexer 72...73 receive events from thresholder 71, time base circuitry 52 and from other events, which are signals originating from various execution units and other units within the microprocessor. All of these various circuit elements of performance monitor 50 are discussed herein and in the cross-referenced patent applications indicated above, and therefore further detailed discussion into the operation of these elements is not provided.

The present invention centers on the requirement that programs are specified as ordered lists of non-idempotent operations and hence instruction streams executed by von Neumann style processors must be carried out in program order. This constraint may perhaps not impact the manner in which the work within the CPU is actually done, but it does impact the manner in which the instructions are completed.

It is generally the case in software systems that the execution of the unit software operations (instructions) are performed in a particular order. There are exceptions of course, but by and large, software systems tend to be implemented as threads of ordered software operations. It is generally not allowable for the effects of these operations to become architecturally visible out of the program specified order.

For example, when counting items via a software system, one might need to obtain the current count value, update the value and replace the count value in its proper storage place. It would not serve the intended purpose of such a software system to carry out these operations out of order.

However, if one sets out to accomplish several unrelated software functions, it is often not necessary to carry out the fundamental software operations comprising the functions in a strict order across function boundaries (i.e., the order of the component operations of independent functions may be amenable to reordering). An important purpose and function of a superscalar processor is to identify in hardware such intertwined threads of otherwise unrelated execution.

Some CPU organizations are designed to be able to take advantage of the opportunity for reordering the execution of the fundamental steps by insuring that the overall apparent order of the execution of the software operations is preserved. The advantage of such CPU organizations is that delays due to obtaining values from memory can often be hidden, thus improving CPU performance.

However, this advantage in performance poses a disadvantage in measurement. Namely, the reordering of the fundamental software operations reduces the cost of long memory delays by allowing the access of memory values well in advance of the actual need. Therefore, it no longer suffices to simply measure the amount of time required to complete memory accesses; to do so will result in an over-counting of the penalty.

To properly assess the effect of the memory performance, a new system and method is proposed. The concepts central to the proposed system and method are discussed next.

Execution reordering schemes typically involve estimating the future execution paths (i.e., sequences or steps of software operations) and executing operations along these paths with the hope that the paths will be found to be the correct ones. This is often referred to as speculative execution. This speculative execution provides much of the opportunity for executing fundamental software operations (such as instructions) out of order.

It is the case that certain operations cannot be executed out of order and that steps must be taken to insure that only those operations that can be correctly performed out of order are those that are actually executed out of order. Additionally, there must be a means of unifying the sequence of operations executed out of order into an appropriately ordered sequence. For example memory locations usually have to be updated in a specific order (as demonstrated by the case of counting via software).

There are schemes using completion units involving reorder buffers and similar mechanisms that permit for the orderly completion/retirement of software operations (e.g., instructions) executed out of order. Key to this concept is the notion of a software architectural model which in essence defines that portion of the CPU execution model that must be updated in a prescribed order with respect to the software operations being executed.

The requirement that software operations generally are completed in a prescribed order with respect to the architectural model of executions enables a CPU implementation to make forward progress by considering primarily the oldest instructions eligible for completion and to a certain extent, neglecting those due for completion in the relatively distant future (i.e., most of the general out of order execution that is going on within the CPU).

The concept of the set of instructions eligible for completion is important, since it naturally allows for simple analysis of the effects of the memory hierarchy by examining fixed elements at a single point in the instructions execution flow. Specifically, there are usually only a small set of software operations (or instructions) that are eligible for completion at any point in time. These eligible operations upon completion may influence the status of as yet incomplete instructions to the point of causing cancellation of particular speculative instructions. So even though there may be essentially finished instructions awaiting the opportunity to become eligible for completion, they typically cannot contribute to the forward progress of execution until they are in fact eligible for completion. It therefore does not matter whether future instructions are indeed finished and ready to be counted as completed until the CPU can actually focus attention on such instructions. Thus, the delaying effect of an instruction need not be considered until such time as it becomes eligible for completion, since at that time it also can block forward progress. Clearly, it is important that those instructions eligible for completion be examined for negative contributions to performance.

Note that this concept extends naturally to higher level processor structures that permit independent threads of execution on shared data flows (hardware thread swapping mechanisms). The applicability stems from the fact that regardless of the high level design (thread swapping), an ordering must be imposed at some level of execution to preserve software semantics. It is at this ordering level that the concept, system and method of the current disclosure is to be employed.

In particular, the following events are amenable to measurement by the discussed performance monitor. In the following discussion, a number of cycles is accumulated on each cycle of the received active event-signal (number of cycles during an asserted event), while a number of times is accumulated during a rise edge detection with respect to a received event signal (number of transitions occurring during an event). Furthermore, a stall occurs when there is work to do, but no forward progress occurs because there is some resource not available. A unit is said to be idle when there is no work for the unit to do.

In the following discussion, a "high" signal also refers to an asserted signal, while a "low" signal also refers to a negated or de-asserted signal.

Figure 8:
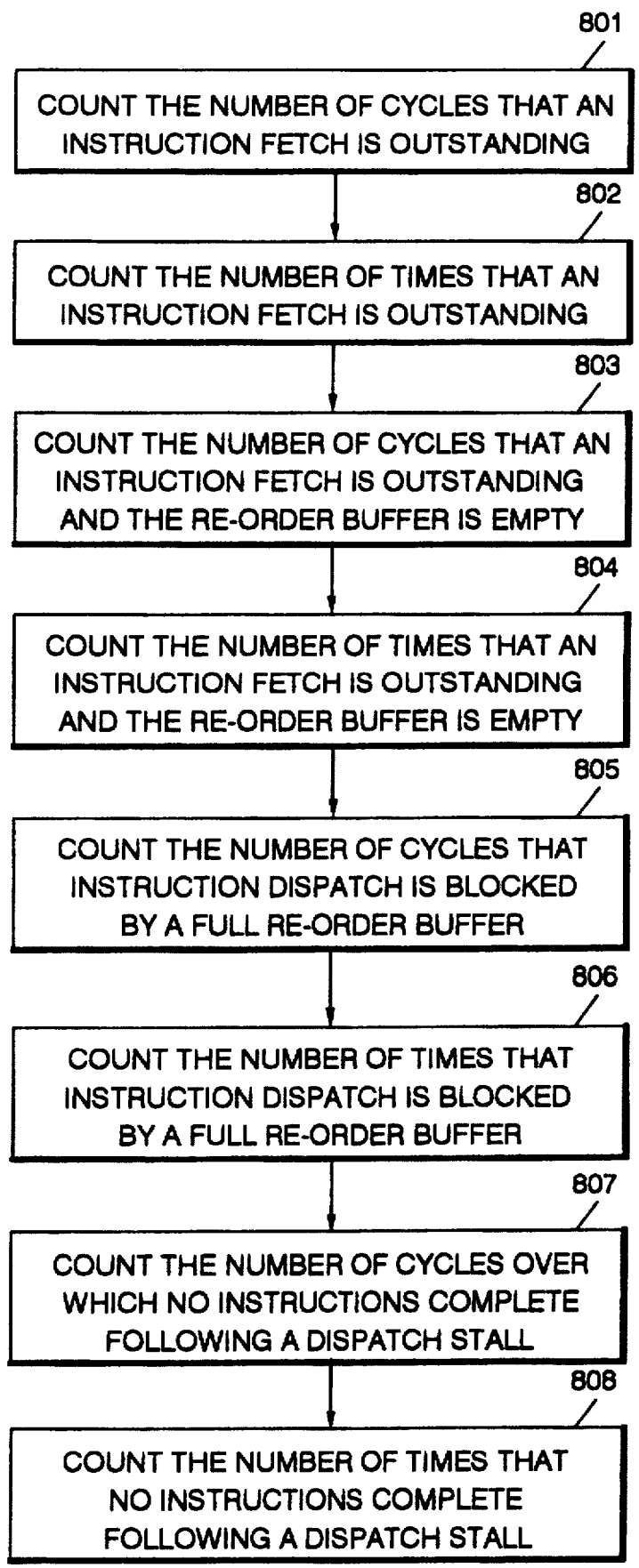
FIG. 8 illustrates a process for instruction fetch bandwidth analysis.

Group 1: Instruction Fetch Bandwidth Analysis (see FIG. 8)

(1) The number of cycles that an instruction fetch is outstanding (step 801). This event is measured by PM 50 receiving a high signal when there is an instruction cache (ICACHE) 14 miss.

(2) The number of times that an instruction fetch occurs (step 802). This event is measured by PM 50 receiving a high signal when there is an ICACHE 14 miss.

(3) The number of cycles that an instruction fetch is outstanding and the reorder buffer 76 is empty (step 803). This event may be measured by PM 50 receiving signals associated with an ICACHE 14 miss and an empty reorder buffer 76, which may be performed via a logical OR of the valid bits per used entry. If the result of this logical OR operation is 0, then reorder buffer 76 is empty.

(4) The number of times that an instruction fetch occurs and the reorder buffer 76 is empty (step 804). This event may be measured by PM 50 receiving signals associated with an ICACHE 14 miss and an empty reorder buffer 76, which may be performed via a logical OR of the valid bits per used entry. If the result of this logical OR operation is 0, then reorder buffer 76 is empty.

(5) The number of cycles that instruction dispatch is blocked by a full reorder buffer 76 situation (step 805). This event may be measured by PM 50 receiving a signal output from dispatch unit 46 when reorder buffer 76 is full and reorder buffer 76 is required.

(6) The number of times that instruction dispatch is blocked by a full reorder buffer 76 situation (step 806). This event may be measured by PM 50 receiving a signal output from dispatch unit 46 when reorder buffer 76 is full and reorder buffer 76 is required.

(7) The number of times that no instructions complete immediately following a dispatch stall (step 807). This event may be measured by PM 50 receiving a signal sent by dispatch unit 46 when it stalls, i.e., all execution units are busy, and there are zero instructions completed the cycle immediately following the dispatch stall.

(8) The number of cycles over which no instructions complete immediately following a dispatch stall (step 808). This event may be measured by PM 50 by receiving a signal sent by dispatch unit 46 when it stalls, i.e., all execution units are busy, and there are zero instructions completed the cycle immediately following the dispatch stall.

This group allows one to contrast between the frequency of misses and the actual cost of misses. In particular, items (5) through (8) represent the cost of the instruction miss on execution. If the buffer 76 does not drain, then there are instructions available to execute. Thus, there was no substantial cost for the miss.

Figure 9:
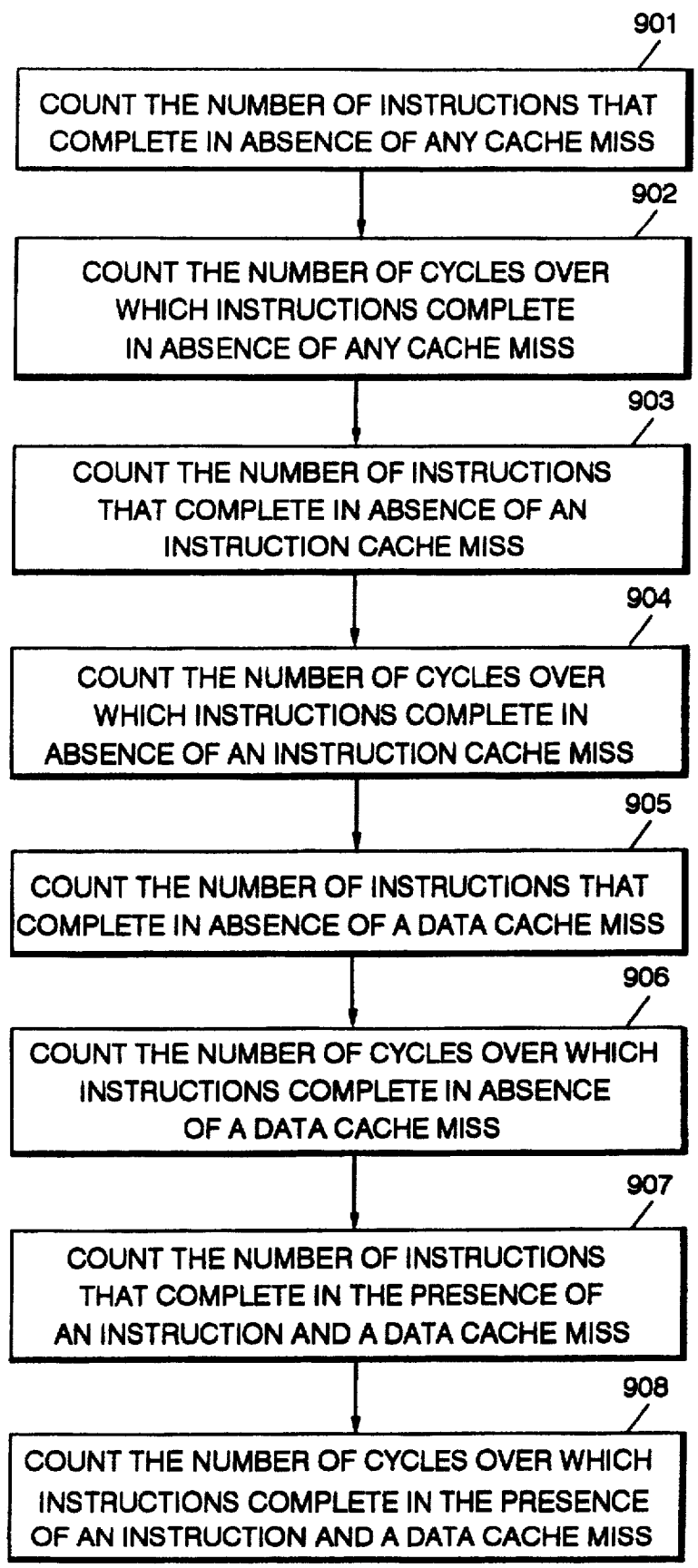
FIG. 9 illustrates a process for CPI infinite and finite analysis.

Group 2: CPI_Infinite and CPI_Finite analysis (see FIG. 9)

(9) The number of instructions that complete in absence of any cache miss (step 901). This event may be measured by PM 50 receiving a signal from either data cache (DCACHE) 16 or ICACHE 14 indicating that a cache miss has occurred and receiving signals from completion unit 48 indicating completed instructions. Since PM 50 is looking for an absence of a cache miss, the counting procedure will be activated by low cache miss signals.

(10) The number of cycles over which instructions complete in absence of any cache miss (step 902). This event may be measured by PM 50 receiving a signal from either DCACHE 16 or ICACHE 14 indicating that a cache miss has occurred and receiving signals from completion unit 48 indicating completed instructions. Since PM 50 is looking for an absence of a cache miss, the counting procedure will be activated by low cache miss signals.

(11) The number of instructions that complete in absence of an instruction cache miss (step 903). This event may be measured by PM 50 receiving an ICACHE 14 miss signal and signals from completion unit 48 indicating completed instructions. Since PM 50 is looking for an absence of a cache miss, the counting procedure will be activated by low cache miss signals.

(12) The number of cycles over which instructions complete in absence of an instruction cache miss (step 904). This event may be measured by PM 50 receiving an ICACHE 14 miss signal and signals from completion unit 48 indicating completed instructions. Since PM 50 is looking for an absence of a cache miss, the counting procedure will be activated by low cache miss signals.

(13) The number of instructions that complete in absence of a data cache miss (step 905). This event may be measured by PM 50 receiving a DCACHE 16 miss signal and signals from completion unit 48 indicating completed instructions. Since PM 50 is looking for an absence of a cache miss, the counting procedure will be activated by low cache miss signals.

(14) The number of cycles over which instructions complete in absence of a date cache miss (step 906). This event may be measured by PM 50 receiving a DCACHE 16 miss signal and signals from completion unit 48 indicating completed instructions. Since PM 50 is looking for an absence of a cache miss, the counting procedure will be activated by low cache miss signals.

(15) The number of instructions that complete in the presence of an instruction and a data cache miss (step 907). This event may be measured by PM 50 receiving high cache miss signals from both ICACHE 14 and DCACHE 16 and receiving completed instruction signals from completion unit 48.

(16) The number of cycles over which instructions complete in the presence of an instruction and a data cache miss (step 908). This event may be measured by PM 50 receiving high cache miss signals from both ICACHE 14 and DCACHE 16 and receiving completed instruction signals from completion unit 48.

In particular, by examining those intervals over which no misses occur, one can obtain statistically valid estimates of CPI_infinite. Thus, items (9) through (16) provide statistical measures of the CPI in the presence of the various miss possibilities. One then has several means to compute CPI_finite which affords an ability to check that the measured quantities are consistent.

Figure 10:
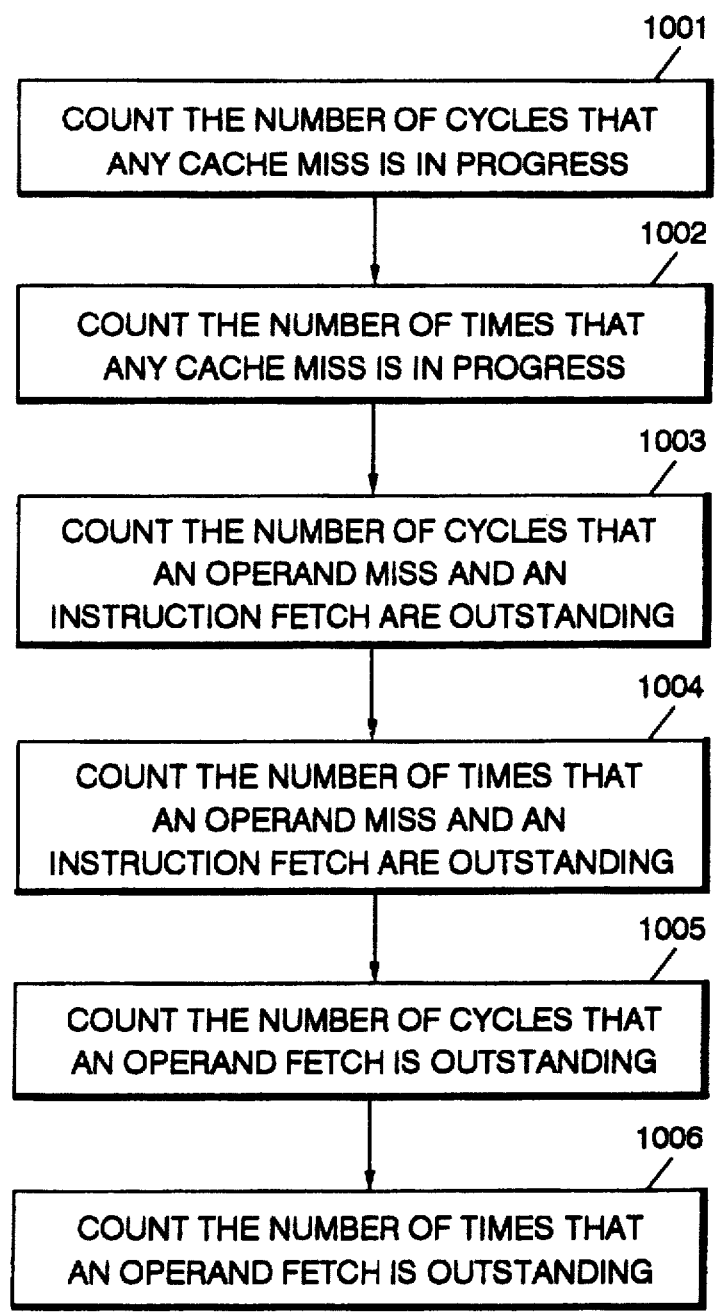
FIG. 10 illustrates a process for operand fetch bandwidth analysis.

Group 3: Operand Fetch Bandwidth Analysis (see FIG. 10)

(17) The number of cycles that any cache miss is in progress (step 1001). This event may be measured by PM 50 receiving high cache miss signals from both ICACHE 14 and DCACHE 16.

(18) The number of times that any cache miss is in progress (step 1002). This event may be measured by PM 50 receiving high cache miss signals from both ICACHE 14 and DCACHE 16.

(19) The number of cycles that an operand miss and an instruction fetch are outstanding (step 1003). A typical example of an unavailable operand is when a dependency exists between one operation and a previous operation, for example, a divide operation may take many cycles, and an add operation is waiting for its results before additional calculations can proceed. A signal goes high when an operand is unavailable is detected. A signal goes high while ICACHE 14 is outstanding.

(20) The number of times that an operand miss and an instruction fetch are outstanding (step 1004). A typical example of an unavailable operand is when a dependency exists between one operation and a previous operation, for example, a divide operation may take many cycles, and an add operation is waiting for its results before additional calculations can proceed. A signal goes high when an operand is unavailable is detected. A signal goes high while ICACHE 14 is outstanding.

(21) The number of cycles that an operand fetch is outstanding (step 1005). This event may be measured by PM 50 receiving a high signal indicating an unavailable operand. Such a signal may originate from any unit that produces an operand.

(22) The number of times that an operand fetch is outstanding (step 1006). This event may be measured by PM 50 receiving a high signal indicating an unavailable operand. Such a signal may originate from any unit that produces an operand.

This group is used to categorize the various cases of simultaneous miss possibilities. These do not apply directly to the CPI equation but are useful metrics regardless.

Figure 11:
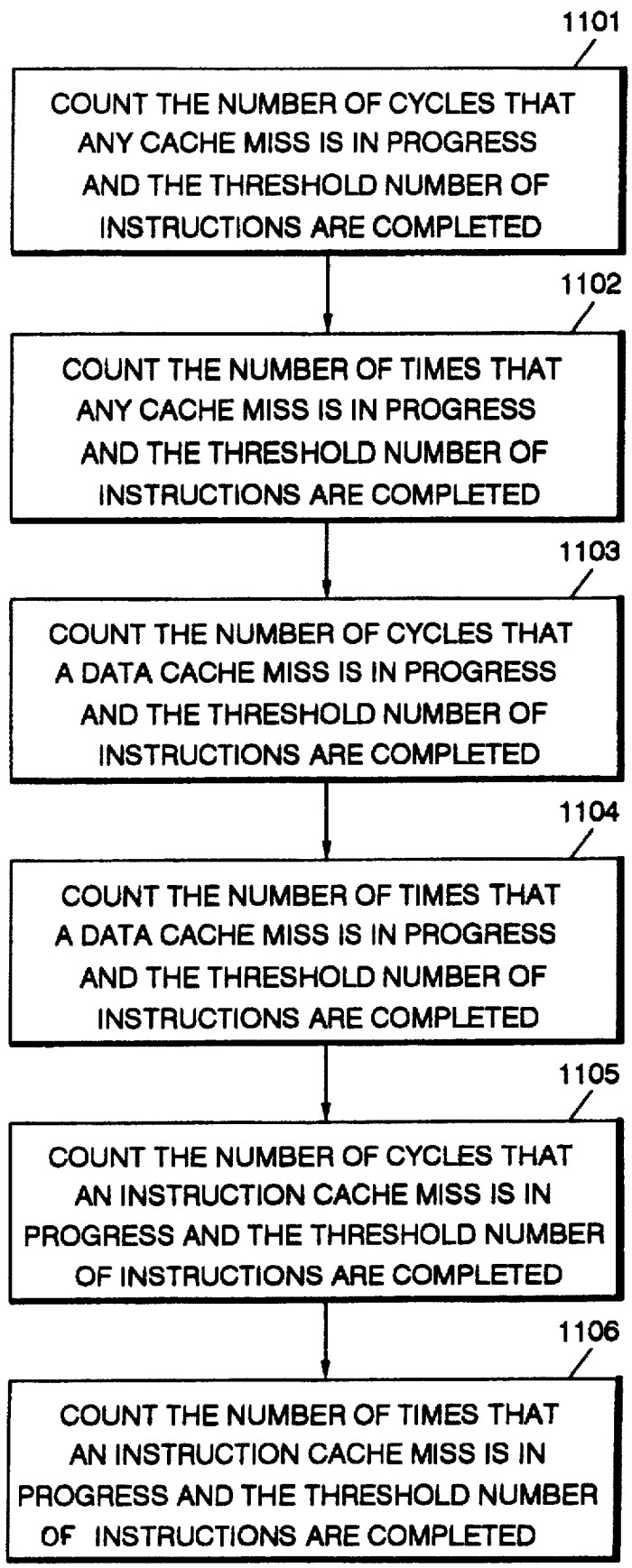
FIG. 11 illustrates a process for instruction parallelism analysis.

Group 4: Instruction Parallelism Analysis (see FIG. 11)

(23) The number of cycles that any cache miss is in progress over the span of time that the threshold number of instructions are completed (step 1101). A threshold completed signal ("TCS") refers to a signal that goes high when a specified number of instructions is completed. The event of step 1101 may be measured by PM 50 receiving high signals from ICACHE 14 and DCACHE 16 and the TCS signal.

(24) The number of times that any cache miss is in progress over the span of time that the threshold number of instructions are completed (step 1102). The event of step 1101 may be measured by PM 50 receiving high signals from ICACHE 14 and DCACHE 16 and the TCS signal.

(25) The number of cycles that a data cache miss is in progress over the span of time that the threshold number of instructions are completed (step 1103). This event may be measured by receiving a high signal from DCACHE 16 and the TCS signal.

(26) The number of times that a data cache miss is in progress over the span of time that the threshold number of instructions are completed (step 1104). This event may be measured by receiving a high signal from DCACHE 16 and the TCS signal.

(27) The number of cycles that an instruction cache miss is in progress over the span of time that the threshold number of instructions are completed (step 1105). This event may be measured by receiving a high signal from ICACHE 14 and the TCS signal.

(28) The number of times that an instruction cache miss is in progress over the span of time that the threshold number of instructions are completed (step 1106). This event may be measured by receiving a high signal from ICACHE 14 and the TCS signal.

Although the threshold function of PowerPC is mentioned explicitly in this section, it is applicable to all sections and groups. In particular, the conditions are stated such that a starting point and ending point are discernable. So in the case of an instruction miss for example, it is clear when a miss finishes, so even when instruction misses overlap, it is still possible to determine the number that executed in an interval. The most appropriate time to demarcate the overlap case is at the point when the critical word is returned. At this point, the threshold count would be applied and a new count commenced.

Figure 12:
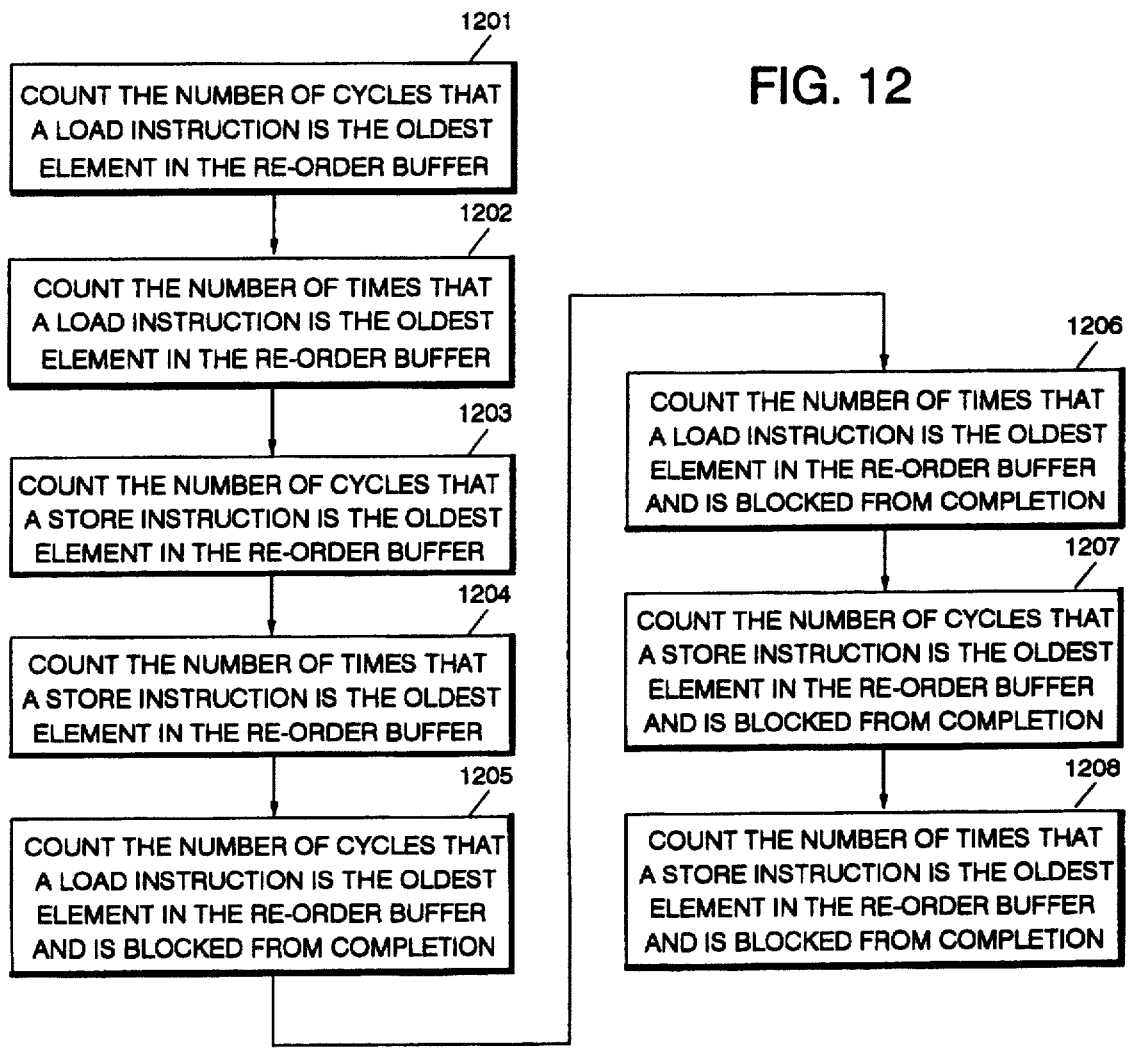
FIG. 12 illustrates a process for load stall analysis.

Group 4: Load Stall Analysis (see FIG. 12)

(29) The number of cycles that a load instruction is the oldest element in the reorder buffer 76 (step 1201). This event may be measured by PM 50 receiving a high signal from reorder buffer 76 indicating that the load instruction is the bottom entry in reorder buffer 76.

(30) The number of times that a load instruction is the oldest element in the reorder buffer 76 (step 1202). This event may be measured by PM 50 receiving a high signal from reorder buffer 76 indicating that the load instruction is the bottom entry in reorder buffer 76.

(31) The number of cycles that a store instruction is the oldest element in the reorder buffer 76 (step 1203). This event may be measured by PM 50 receiving a high signal from reorder buffer 76 indicating that the store instruction is the bottom entry in reorder buffer 76.

(32) The number of times that a store instruction is the oldest element in the reorder buffer 76 (step 1204). This event may be measured by PM 50 receiving a high signal from reorder buffer 76 indicating that the store instruction is the bottom entry in reorder buffer 76.

(33) The number of cycles that a load instruction is the oldest element in the reorder buffer 76 and is blocked from completion (step 1205). This event may be measured by PM 50 receiving a high signal from completion unit 48 indicating that the oldest instruction in reorder buffer 76 is a load instruction and that completion is stalled with the same load instruction. Completion unit 48 is able to determine when and for what reason a completion stall occurs.

(34) The number at times that a load instruction is the oldest element in the reorder buffer 76 and is blocked from completion (step 1206). This event may be measured by PM 50 receiving a high signal from completion unit 48 indicating that the oldest instruction in reorder buffer 76 is a load instruction and that completion is stalled with the same load instruction. Completion unit 48 is able to determine when and for what reason a completion stall occurs.

(35) The number of cycles that a store instruction is the oldest element in the reorder buffer 76 and is blocked from completion (step 1207). This event may be measured by PM 50 receiving a high signal from completion unit 48 indicating that the load instruction is the oldest instruction in reorder buffer 76 and that its completion is stalled. Completion unit 48 is able to determine when and for what reason a completion stall occurs.

(36) The number of times that a store instruction is the oldest element in the reorder buffer 76 and is blocked from completion (step 1208). This event may be measured by PM 50 receiving a high signal from completion unit 48 indicating that the load instruction is the oldest instruction in reorder buffer 76 and that its completion is stalled. Completion unit 48 is able to determine when and for what reason a completion stall occurs.

By examining the progress made in completion unit 48, the cost can be determined that is imposed on the execution pipe by a load or store miss. It is important to contrast the cost in terms of the measured infinite cache CPI. By examining the weighted average of the CPI with and without misses and by assuming that misses occur randomly, a reasonable delta can be computed on misses with which to understand and rank CPU/workload performance.

Figure 13:
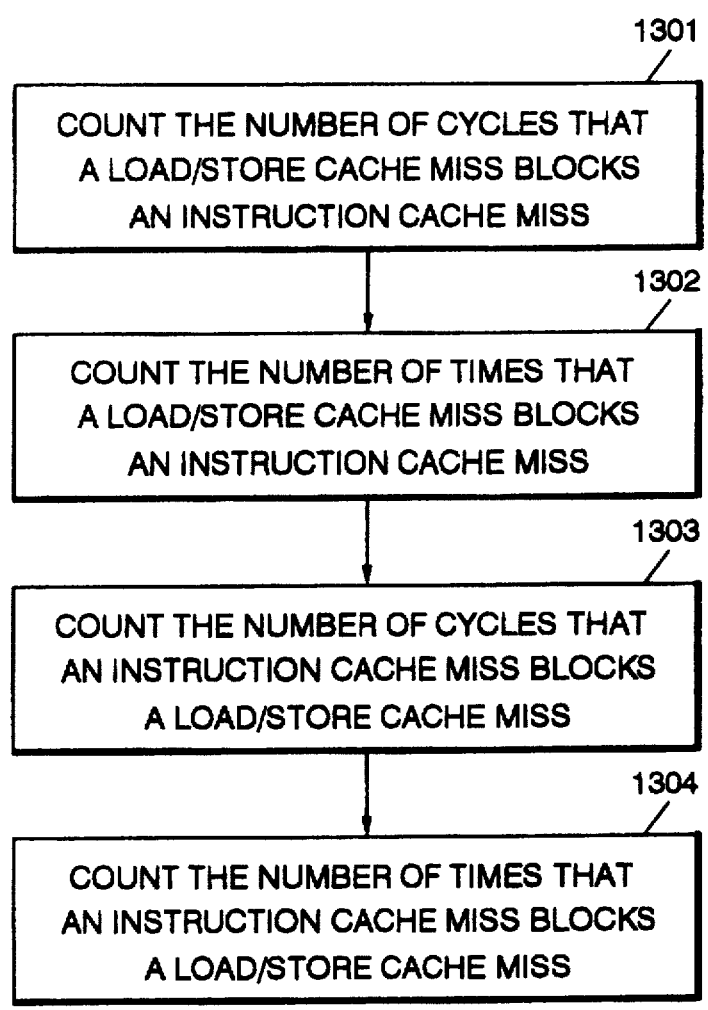
FIG. 13 illustrates a process for trailing edge analysis.

Group 5: Trailing Edge Analysis (see FIG. 13)

(37) The number of cycles that a load/store miss blocks an instruction cache 14 miss (step 1301). In systems with secondary combined ICACHEs 14 and DCACHEs 16, a DCACHE 16 miss may take priority over a simultaneous ICACHE 14 miss. In this example, a signal would be set high by some type of arbitration logic, which creates signals for winner(s) and loser(s). A signal will be generated by ANDing the DCACHE win signal with the inverse of the ICACHE win signal.

(38) The number of times that a load/store miss blocks an instruction cache 14 miss (step 1302). In systems with secondary combined ICACHEs 14 and DCACHEs 16, a DCACHE 16 miss may take priority over a simultaneous ICACHE 14 miss. In this example, a signal would be set high by some type of arbitration logic, which creates signals for winner(s) and loser(s). A signal will be generated by ANDing the DCACHE win signal with the inverse of the ICACHE win signal.

(39) The number of cycles that an instruction miss blocks a load/store cache miss (step 1303). In systems with secondary combined ICACHEs 14 and DCACHEs 16, an ICACHE 14 miss may take priority over a simultaneous DCACHE 16 miss. In this example, a signal would be set high by some type of arbitration logic, which creates signals for winner(s) and loser(s). A signal will be generated by ANDing the ICACHE win signal with the inverse of the ICACHE win signal.

(40) The number of times that an instruction miss blocks a load/store cache miss (step 1304). In systems with secondary combined ICACHEs 14 and DCACHEs 16, an ICACHE 14 miss may take priority over a simultaneous DCACHE 16 miss. In this example, a signal would be set high by some type of arbitration logic, which creates signals for winner(s) and loser(s). A signal will be generated by ANDing the ICACHE win signal with the inverse of the ICACHE win signal.

The purpose of this group is to evaluate the frequency and effect of trailing edge and queuing delays. While this does not directly fit into the CPI equation, it provides an important metric by showing the increase in access latency due to queuing delays.

In summary, an individual skilled in the art of CPU analysis will realize that the disclosed system and method provides a substantial improvement over previous analysis techniques and is novel in that it is based in novel execution strategies.

The foregoing groups may each be measured using any number of counters. Additionally, certain events may be sampled periodically and/or measurements repeated to determine the repeatability of scenarios.

Although the present invention and its advantages have been described in detail, it should be understood that various changes, substitutions and alterations can be made herein without departing from the spirit and scope of the invention as defined by the appended claims.

What is claimed is:

1. A method in a data processing system comprising the steps of:

receiving signals associated with a load/store cache miss blocking an instruction cache miss; and counting signals associated with the load/store cache miss blocking the instruction cache miss.

2. The method as recited in claim 1, wherein the counting step further comprises the step of:

counting a number of cycles when the load/store cache miss is blocking the instruction cache miss.

3. The method as recited in claim 1, wherein the counting step further comprises the step of:

counting a number of times that the load/store cache miss is blocking the instruction cache miss.

4. The method as recited in claim 1, wherein the counting step further comprises the steps of:

counting a number of cycles when the load/store cache miss is blocking the instruction cache miss; and counting a number of times that the load/store cache miss is blocking the instruction cache miss.

5. The method as recited in claim 1, further comprising the step of:

counting signals associated with an instruction cache miss blocking a load/store cache miss.

6. The method as recited in claim 5, further comprising the step of:

counting a number of cycles when the instruction cache miss is blocking the load/store cache miss.

7. The method as recited in claim 5, further comprising the step of:

counting a number of times when the instruction cache miss is blocking the load/store cache miss.

8. The method as recited in claim 1, further comprising the steps of:

counting a number of cycles when the instruction cache miss is blocking the load/store cache miss; and counting a number of times when the instruction cache miss is blocking the load/store cache miss.

9. A performance monitor in a data processing system comprising:

circuitry for receiving signals associated with a load/store cache miss blocking an instruction cache miss; and circuitry for counting signals associated with the load/store cache miss blocking the instruction cache miss.

10. The performance monitor as recited in claim 9, wherein the counting circuitry further comprises:

circuitry for counting a number of cycles when the load/store cache miss is blocking the instruction cache miss.

11. The performance monitor as recited in claim 9, wherein the counting circuitry further comprises:

circuitry for counting a number of times that the load/store cache miss is blocking the instruction cache miss.

12. The performance monitor as recited in claim 9, wherein the counting circuitry further comprises:

circuitry for counting a number of cycles when the load/store cache miss is blocking the instruction cache miss; and circuitry for counting a number of times that the load/store cache miss is blocking the instruction cache miss.

13. The performance monitor as recited in claim 9, further comprising:

circuitry for counting signals associated with an instruction cache miss blocking a load/store cache miss.

14. The performance monitor as recited in claim 13, further comprising:

circuitry for counting a number of cycles when the instruction cache miss is blocking the load/store cache miss.

15. The performance monitor as recited in claim 13, further comprising:

circuitry for counting a number of times when the instruction cache miss is blocking the load/store cache miss.

16. The performance monitor as recited in claim 9, further comprising:

circuitry for counting a number of cycles when the instruction cache miss is blocking the load/store cache miss; and circuitry for counting a number of times when the instruction cache miss is blocking the load/store cache miss.

17. A performance monitor in a data processing system, comprising:

circuitry for counting signals associated with an instruction cache miss blocking a load/store cache miss; and circuitry for counting signals associated with the load/store cache miss blocking the instruction cache miss.

18. The performance monitor as recited in claim 17, wherein the circuitry for counting signals associated with the load/store cache miss blocking the instruction cache miss further comprises:

circuitry for counting a number of cycles when the load/store cache miss is blocking the instruction cache miss; and circuitry for counting a number of times that the load/store cache miss is blocking the instruction cache miss.

19. The performance monitor as recited in claim 18, wherein the circuitry for counting signals associated with the instruction cache miss blocking the load/store cache miss further comprises:

circuitry for counting a number of cycles when the instruction cache miss is blocking the load/store cache miss; and circuitry for counting a number of times when the instruction cache miss is blocking the load/store cache miss.

* * * * *

UNITED STATES PATENT AND TRADEMARK OFFICE
CERTIFICATE OF CORRECTION

PATENT NO : 5,802,273

DATED: : September 1, 1998

INVENTOR(S) : Frank Eliot Levine; Roy Stuart Moore; Charles Philip Roth; and Hugh Welbon It is certified that error appears in the above-identified patent and that said Letters Patent is hereby corrected as shown below:

Col. 2, Line 63: Please delete "$ratio*DC_{miss}$" and replace with --ratio*DC_miss--

Col. 11, Line 54: Please delete "MMCRO" and replace with --MMCR0--

Signed and Sealed this

Second Day of November, 1999

Attest:

Q. TODD DICKINSON

Attesting Officer

Acting Commissioner of Patents and Trademarks